United States Patent
Rolle et al.

(10) Patent No.: US 10,252,193 B2
(45) Date of Patent: Apr. 9, 2019

(54) REPLACEABLE FILTER OF A FILTER DEVICE, AND FILTER DEVICE

(71) Applicant: MANN+HUMMEL GMBH, Ludwigsburg (DE)

(72) Inventors: Arndt-Udo Rolle, Stuttgart (DE); André Roesgen, Remshalden (DE); Christian Thalmann, Speyer (DE); Frank Pflueger, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 291 days.

(21) Appl. No.: 15/218,058

(22) Filed: Jul. 24, 2016

(65) Prior Publication Data
US 2016/0332096 A1 Nov. 17, 2016

Related U.S. Application Data (63) Continuation of application No. PCT/EP2015/051240, filed on Jan. 22, 2015.

(30) Foreign Application Priority Data

Jan. 23, 2014 (DE) .......... 10 2014 000 717
Feb. 20, 2014 (DE) .......... 10 2014 002 239
Jan. 12, 2015 (DE) .......... 10 2015 000 069

(51) Int. Cl.
*B01D 35/30* (2006.01)
*B01D 29/96* (2006.01)
(Continued)

(52) U.S. Cl.
CPC ............ *B01D 29/96* (2013.01); *B01D 27/08* (2013.01); *B01D 35/005* (2013.01); *B01D 35/30* (2013.01);
(Continued)

(58) Field of Classification Search
None
See application file for complete search history.

(56) References Cited

U.S. PATENT DOCUMENTS

| 5,490,930 A | 2/1996 | Krull |
| 6,096,208 A | 8/2000 | Connelly |

FOREIGN PATENT DOCUMENTS

| DE | 102010035465 A1 * | 2/2012 | ............. B01D 29/21 |
| DE | 102010035465 A1 | 2/2012 | |

(Continued)

OTHER PUBLICATIONS

DE102010035465A1—EPO Machine Translation, 21 pages. (Year: 2018).*

*Primary Examiner* — Patrick J Orme
(74) *Attorney, Agent, or Firm* — James Hasselbeck (57) ABSTRACT

A replaceable filter of a filter device has a housing bowl in which at least one filter element is arranged. At least one filter-side coupling part of a coupling device is arranged on the end face of the housing bowl for detachable connection of the replaceable filter to the filter head. At least one fluid opening arranged on the end face of the housing bowl. A shaped sheet metal part is connected to the end face rim of the housing bowl via a shaped flange or ring that is integrally manufactured as one piece, having at least one molded seal seating groove that is open in the radial direction and peripheral with respect to the coupling axis for the seating an outer seal.

7 Claims, 5 Drawing Sheets

(51) Int. Cl.
*B01D 27/08* (2006.01)
*B01D 35/00* (2006.01)
(52) U.S. Cl.
CPC .. *B01D 2201/304* (2013.01); *B01D 2201/347* (2013.01); *B01D 2201/4015* (2013.01)

(56) References Cited

FOREIGN PATENT DOCUMENTS

| EP | 0221675 A2 | * | 5/1987 | ........... B01D 27/005 |
|----|------------|---|--------|-------------------------|
| EP | 2002875 A1 |   | 12/2008 |                        |

* cited by examiner

Fig. 3 form a first component of a bayonet-type coupling. The ramped projections work together with similar projections of the filter cartridge for the attachment of the filter cartridge to the filter head. A sealing ring is arranged between the filter head and the filter cartridge.

REPLACEABLE FILTER OF A FILTER DEVICE, AND FILTER DEVICE

TECHNICAL FIELD

The invention relates to a replaceable filter, in particular a spin-on filter, of a filter device for a fluid substance, in particular a liquid, in particular oil or fuel, in particular of an internal combustion machine, in particular of a motor vehicle.

Furthermore, the invention relates to a filter device for a fluid substance, in particular a liquid, in particular oil or fuel, in particular of an internal combustion engine, in particular of a motor vehicle, having at least one replaceable filter, in particular a spin-on filter.

BACKGROUND

A filter device having a filter head and a filter cartridge is known from EP 0 830 885 A1. The filter cartridge is attached to the filter head. The filter head comprises a plurality of outwardly extending ramped projections that form a first component of a bayonet-type coupling. The ramped projections work together with similar projections of the filter cartridge for the attachment of the filter cartridge to the filter head. A sealing ring is arranged between the filter head and the filter cartridge.

SUMMARY

The object of the invention is to configure a replaceable filter and a filter device of the aforementioned type in which a realization of a coupling between the replaceable filter and a filter head, in particular a realization of a seal on the replaceable filter may be simplified and/or improved. In particular, a leakproofness of the installed filter device with respect to the surrounding environment is to be improved.

This object is achieved according to the invention by virtue of the replacement filter having:
  a housing bowl in which at least one filter element is arranged,
  at least one filter-side coupling part of a coupling device arranged on the end face of the housing bowl for detachable connection of the replaceable filter to a filter head of the filter device via a pushing and/or turning movement with respect to a coupling axis of the replaceable filter,
  at least one opening arranged on the end face of the housing bowl, in particular a central opening in the middle and/or at least one fluid opening that is radially outwardly offset with respect to the central opening and/or with respect to the coupling axis.
  a shaped sheet metal part connected to the end face rim of the housing bowl via a shaped flange, in particular a sheet-metal ring that is in particular integrally manufactured as one piece, having at least one molded seal seating groove that is open in the radial direction and peripheral with respect to the coupling axis, in particular coaxial, for the seating of at least one seal, in particular an outer seal,
wherein at least one seal seating groove runs radially around the outside of at least one opening, as appropriate the central opening and/or the at least one fluid opening, with respect to the coupling axis,
  and wherein at least one seal is or may be arranged in at least one seal seating groove and has at least one sealing surface oriented radially and/or axially with respect to the coupling axis for contact against at least one sealing surface on the filter-head side that is oriented radially and/or axially with respect to the coupling axis in order to seal at least one fluid compartment formed between the replaceable filter and the filter head from the surrounding environment when the replaceable filter is installed on the filter head.

At least one filter element is arranged within the housing bowl of the filter housing for the replaceable filter. The replaceable filter is replaced complete with the filter housing and the at least one filter element contained therein. Replaceable filters of this type may be designed as spin-on filters, turn-on filters, in particular screw-on filters.

Advantageously, the at least one filter element may be arranged fixedly in the filter housing. Alternatively, at least one filter element may be arranged replaceably in the filter housing.

The replaceable filter may easily be releasably attached to the filter head with the coupling device.

According to the invention, the shaped sheet-metal part has at least one seal seating groove for the seating of at least one seal, in particular an outer seal sealing off the surrounding environment. The at least one seal is seated in the at least one seal seating groove of the shaped sheet-metal part. The shaped sheet-metal part is connected to the end face rim of the housing bowl via the shaped flange. Thus, the at least one seal may be or become attached to the side of the replaceable filter in a lose-proof manner.

Advantageously, the at least one seal seating groove and the corresponding seal may be arranged in the vicinity of the peripheral wall, in particular the outer wall, of the housing bowl. In this way, the cross-sections of areas that are radially inside the seal and through which the fluid to be filtered can flow may be expanded.

At least one seal may advantageously provide sealing between the filter head and the replaceable filter that acts radially and/or axially with respect to coupling axis. With a radially acting seal, the flow cross-sections may be further radially expanded inside the seal. Moreover, a radially acting seal may be arranged in an axial-orientation-position-tolerant manner. In this way, axial position tolerances between the at least one radially acting seal and the corresponding sealing surface may in particular be better compensated depending on operating conditions.

Operating-condition-dependent position tolerances may be called for in particular due to vibrations and/or pressure pulsations during operation.

Advantageously, at least one seal may provide sealing only in the radial direction with respect to the coupling axis. In this way, any compression of the at least one seal can be essentially independent of the extent to which the coupling device is closed. In this way, any mechanical stress on the seal may be reduced.

By using the shaped sheet-metal part with at least one seal, the open cross-section for the flow of fluid may be reduced to less than has been the case with conventional replaceable filters, in particular in the region of the fluid chamber. In this way, any pressure losses between the unfiltered fluid side and the filtered fluid side may be reduced. The replaceable filter can be used in particular with filter devices, in particular prefilters, in which a suction level of fluid pumps may be limited and/or degassing and, in extreme cases, even cavitation can occur. In particular with filter devices of this type, a pressure loss between the unfiltered fluid side and the filtered fluid side may be reduced using the replaceable filter according to the invention.

The configuration of the at least one seal seating groove permits a great degree of design freedom in relation to the at least one seal that is used. Thus, especially with regard to maintenance-friendliness or serviceability, a corresponding shape of the at least one seal seating groove and/or a corresponding suitable sealing chamber may be selected.

The at least one seal may advantageously have at least one sealing ring, in particular an O-ring seal or one of that type. Alternatively or additionally, the at least one seal may have or be a sealing ring of a different form, in particular one with an angled and/or flat and/or high profile. At least one seal may also be configured as a flat ring seal. An O-ring seal has the advantage that, when there is a pushing movement in the direction of the coupling axis, it can easily slide along on a corresponding radially inner and/or radially outer sealing surface. With the O-ring seal, the radial sealing effect can be better defined and/or adjusted than with a flat (ring) seal.

Advantageously, at least one seal can be at least partially elastic. In this way, the sealing function can be improved. Furthermore, in this way the seal can contribute to a compensation of tolerances that are, in particular, manufacturing-related and/or operation-related and/or contribute to a damping of operation-related vibrations.

Advantageously, at least one seal can have at least one suitable retaining means, in particular at least one retaining nose, with which the seal can be held in the at least one seal seating groove.

At least one seal radially to the outside with respect to the coupling axis can advantageously rest against a corresponding surface, in particular a bottom, of the corresponding at least one seal seating groove. Alternatively, it can also rest radially to the inside against a corresponding surface of the seal seating groove.

A bottom of the at least one seal seating groove may advantageously serve as a radially acting counter surface for the at least one seal against which the seal can brace.

The shaped sheet metal part can advantageously be shaped from sheet metal according to a deep drawing process and/or a hydroforming process or similar process and/or a cold forming process. In this way, the shaped sheet-metal part with an inner diameter may be realized that, with other manufacturing methods cannot at all be comparably realized or at least can only be realized at a substantially higher cost. Thus, even radially inner complex deformations, in particular radially inwardly open seal seating grooves, may be realized using the method mentioned at the outset. The shaped sheet-metal part may therefore be made from one piece, that is, integrally, with complex contours. According to the invention, the shaped sheet-metal part does not have to be put together from a plurality of parts, in particular welded or soldered, as is otherwise required for manufacturing methods otherwise used in connection with replaceable filters to make complex contours, in particular undercuts.

The shaped sheet-metal part may advantageously be manufactured using a follow-on composite tool according to the so-called hydroforming process. In this way, the shaped sheet metal part having relatively high complexity because of its size can be manufactured in a relatively small tool.

Deep drawing is generally defined as seamless and non-cutting deformation of metal. Deep drawn parts are manufactured by bringing a custom cut sheet metal panel into the desired shape by pressure and the use of a forming die.

A deep drawing method based on hydroforming or internal high-pressure forming may be used. In this way, a cylindrical part, in particular a metallic tube, may be deformed in a closed form tool. In the form tool, which also serves as a sealing device, an internal pressure of up to 3000 bar or more can be built up. This internal pressure presses the cylindrical part to be deformed, in particular a round part, against the wall of the form tool and thereby reproduces the corresponding shape. Thus, it is also possible to realize undercuts, in particular radially open seal seating grooves, in series production.

The at least one filter-side coupling part, in particular with a thread and/or a coupling element of a bayonet-closure-type connection, can advantageously be realized in conjunction with a separate cover part, in particular a housing cover. In the case of the variant with threads, the threads are preferably screw threads, in particular single-start screw threads.

The cover part may advantageously be of annular shape. The cover part may advantageously have an annular disk section. The at least one filter-side coupling part may advantageously be integrally joined with the annular disk section.

The cover part may advantageously have at least one end-face opening, in particular an insertion opening for a connection cylinder. The connection cylinder may advantageously realize a central opening in the middle and/or at least one outwardly radially offset fluid opening. The at least one filter-side coupling part, in particular the cover part, may advantageously be formed out of plastic, in particular (injection) molded.

Advantageously, the cover part may be designed as the termination, in particular for the at least partial closure of the replaceable filter housing.

The filter-side coupling part may be integrally joined as one piece with the cover part. In this way, it is possible to reduce expenditure on components.

Both the separate cover part and at least one seal may be held on the housing bowl with the shaped sheet-metal part.

The at least one shaped sheet-metal part and at least one filter-side coupling part may be movable relative to each other within a predefinable amount of play. This makes it easier to compensate for component-related and/or installation-related and/or operation-related position tolerances.

A shaped flange, in particular a beading, may be realized according to a forming process in which the rims of the cylindrical parts to be joined, in particular the shaped sheet-metal part and the rim of the housing bowl, are bent up. The material can be compressed in this context. The rim regions of the parts to be joined are bent around each other, in particular crimped. This makes possible a tight connection between the parts. Advantageously, the parts to be joined may be bent around each other radially outwardly with respect to the coupling axis. Alternatively, they may also be bent radially inwardly. Combinations of radial outward and radial inward bends can also be carried out.

At least one sealing compound or sealing material may be disposed between the rim regions of the parts to be crimped before, during or after the deformation process. This improves the sealing of the crimped joint.

The shaped flange makes it possible to realize a stable connection between the at least one seal seating groove—and with it the at least one seal—and the connection body.

The shaped flange also makes it easy to combine the shaped sheet-metal part with standard components, in particular housing bowls and/or filter-side coupling parts and/or cover parts, in particular housing covers. A combination of this type is easy to implement.

Advantageously, the filter device, in particular the replaceable filter, may be designed in such a way that the unfiltered fluid is fed to the end face and the filtered fluid is discharged at the same end face. Advantageously, at least one feed, in particular an inlet, and at least one discharge, in particular at least one outlet, are arranged on the same end face of the replaceable filter.

In this context, a central opening in the middle may advantageously be a fluid outlet opening through which filtered fluid can exit the replaceable filter. At least one fluid opening that is radially outwardly offset with respect to the central opening in the middle and/or with respect to the coupling axis may accordingly be a fluid inlet opening through which the fluid to be filtered can come into the replaceable filter. Alternatively, the central opening in the middle may be a fluid inlet opening and the at least one offset fluid opening may be a fluid outlet opening.

Alternatively, the central opening may be designed in such a way that both the unfiltered fluid and the filtered fluid may flow through it, respectively, into the replaceable filter and out of the replaceable filter.

Advantageously, at least one seal seating groove, in particular at least one seal, may be arranged on the side of the shaped flange that axially faces the bowl bottom of the housing bowl. In this way, the at least one seal may be arranged so as to be protected within the housing bowl. Furthermore, this can reduce the axial installation space of the replaceable filter.

Advantageously, at least one corresponding head-side sealing surface may be arranged on the side of the filter head and work together with the at least one seal, in particular an outer seal so as to provide a sealing connection. In this context, the at least one sealing surface may be located radially to the outside, radially to the inside and/or radially at the same width as the at least one seal.

Advantageously, at least one head-side sealing surface may be realized in conjunction with at least one head-side coupling part. Advantageously, at least one head-side sealing surface on a radially outer and/or radially inner perimeter side and/or an end face of a hollow cylinder section may be realized.

Advantageously, at least one head-side coupling part may have at least on coupling element, in particular an inner threading/outer threading and/or a coupling part of a bayonet-type connection on a radially inner or radially outer perimeter side of a hollow cylinder section.

Advantageously at least one head-side sealing surface may be arranged on a radially opposing side of a head-side coupling element of at least one head-side coupling part. In this way, radial forces that act on the head-side coupling element when the replaceable filter is connected to the filter head may be transferred to the head-side sealing surface. In this way, a sealing function can be improved.

Advantageously, the at least one seal, in particular the outer seal, of the coupling parts may be separated, that is, not directly connected with one of the coupling parts. In this way, the at least one seal and the coupling parts may each be optimized for their respective functions. Furthermore, the at least one seal may be decoupled from mechanical forces that act on the coupling parts. Furthermore, this can better compensate for any positioning tolerances.

At least one other mechanical intermediate component, in particular a component of the filter head or a cover part, in particular an annular disk section of a housing cover, and/or a force-transmission element of the replaceable filter may be arranged between the shaped flange and the connecting parts. The at least one seal and the coupling parts may therefore be separated by the at least one intermediate component. The at least one intermediate component may effect a mechanical decoupling between the at least one seal and at least one of the coupling parts. Simultaneously, the at least one intermediate component can make it possible to increase the design freedom of both the coupling parts and the at least one seal. In particular, design measures—in particular for compensation of mechanical loads that each act on the at least one seal, on the coupling parts and on the at least one intermediate component—and/or component-related or operation-related tolerances and/or operation-related vibrations can be improved separately from one another.

The coupling parts may each be made of a single material or of a mix of materials. The coupling parts may advantageously be made of plastic, metal—in particular aluminum and/or sheet metal—or have a material of this type. The at least one head-side coupling part and the at least one filter-side coupling part may be made of the same material or of different materials.

The replaceable filter may advantageously have a round cross-section. The replaceable filter may advantageously be coaxial with respect to a filter axis. The filter axis may advantageously coincide with the coupling axis. Assembly may be simplified in this manner.

The replaceable filter comprises at least one filter element. The filter element may advantageously have a filter medium that is circumferentially closed. The filter medium may advantageously be folded or bent in a star or zig-zag shape or. The filter medium may advantageously be tightly connected on at least one end face with an end body, in particular an end disk. The filter element may advantageously be coaxial with respect to the filter axis.

The filter element may advantageously have at least one support body. The support body may advantageously be a center tube. The support body may advantageously be located in an element interior space of the filter element. The support body may extend between the end bodies. At least one end body may brace against at least one support body axially with respect to the filter axis. In this way, at least forces that are at axially oriented with respect to the coupling axis may be transmitted between the at least one end body and the at least one support body.

Advantageously, the replaceable filter may additionally have at least one component of a separation device for separating water from the fluid, in particular fuel or oil. Advantageously, the replaceable filter may have at least one coalescence medium and/or at least one separating tube, in particular a strainer basket. With the coalescence medium, the smallest water drops contained in the fluid are combined into large water drops. The separating tube can have a perimeter wall with/made of a hydrophobic (sieve) material. The perimeter wall of the separating tube can be sieve-like at least in sections. The water droplets can be held back against the perimeter wall and drop down or rise up in a corresponding upstream precipitation slot based on gravitational force depending on the density of the fluid to be filtered. The fluid to be filtered may flow through the perimeter wall of the separating tube. The separating tube may be connected at the end to a fluid outlet, in particular an outlet cylinder, of the replaceable filter. In this way, the fluid relieved of water can get out of the separating tube to the outside through the fluid outlet. The outlet cylinder may easily be hydraulically connected to a corresponding connecting piece of the filter head, in particular by slipping the former over or into the latter.

The filter device, in particular the replaceable filter element, is suitable for cleaning—in particular filtering—fluid. In particular, fluids, in particular oil or fuel, can thus be filtered. Advantageously, operating fluids of the internal combustion engine can be filtered via the filter device, in particular the replaceable filter element. During the cleaning, the fluid can be filtered and relieved of dirt particles. In addition, water contained in the fluid can be separated out.

The filter device can be used with internal combustion engines of motor vehicles. It may also be used for other types of internal combustion engines, in particular industrial engines. The invention may also be used outside of internal combustion engines, in particular in automotive engineering.

The filter device has a filter head on which a replaceable filter may be installed. The filter head may have at least one feed and/or at least one discharge for the fluid. The filter head may preferably be fixedly attached to a frame. The frame may in particular be a part of the internal combustion engine and/or the motor vehicle.

The filter head has at least one head-side coupling part of the coupling device for the replaceable filter. The replaceable filter has at least one filter-side coupling part of the coupling device. At least one head-side coupling part may be detachably connected to at least one filter-side coupling part.

The connection device may advantageously be lockable and releasable via a combined pushing movement and turning movement (push and/or turn movement) with respect to the coupling axis. Combined push/turn connections can easily and quickly be closed and opened. Furthermore, they are robust with respect to tensile loads in the direction of the coupling axis. With the coupling device, a quick-release closure may therefore easily be realized that can be easily and quickly closed and opened. At push and/or turn connection may be realized in particular as a screw-on connection and/or a bayonet-closure-type of connection. In the case of a screw-on connection, the replacement filter may be called a spin-on filter or a screw-on filter.

With the at least one seal, in particular an outer seal, the fluid-conducting spaces, in particular spaces between the replaceable filter and the filter head and/or fluid openings, may be separated in a leak-proof manner from the surrounding environment. Thus, the at least one seal may be located on the unfiltered side or the filtered side of the filter element of the replacement filter. This may depend on the direction of flow of the fluid through the replaceable filter.

In an advantageous embodiment, at least one seal seating groove may be radially inwardly open and/or at least one seal seating groove may be radially outwardly open with respect to the coupling axis. In this way, the at least one seal may be introduced into the at least one seal seating groove from the open side. The at least one seal may radially project through the open side of the at least one seal seating groove. With its projecting section, it can cooperate with at least one corresponding sealing surface on the filter-head side to provide sealing in the radial and/or axial direction.

In a further advantageous embodiment, the housing bowl may be made of sheet metal, at least in its rim region. In this way, the rim region of the housing bowl may be easily and reliably connected to the shaped sheet-metal part via the shaped flange.

Advantageously, the entire housing bowl may be made of sheet metal. In this way, it can easily and sturdily be made in one piece.

In a further advantageous embodiment, the side of at least one seal seating groove that is radially open with respect to the coupling axis may be arranged with respect to the coupling axis, when viewed from a radial perspective, opposite a coupling side of at least one filter-side coupling part—in particular a threading and/or a coupling element of a bayonet-type connection—which is located on the same side with respect to the coupling axis.

In this way, a corresponding head-side coupling part may easily be arranged radially between the at least one seal and the at least one filter-side coupling part. The at least one head-side coupling part may thus be pressed against the at least one seal via the at least one filter-side coupling part. A sealing effect can be improved in this way.

Advantageously, an annular filter-side coupling part may be arranged radially inside at least one seal seating groove with respect to the coupling axis. The at least one seal seating groove may in this case be radially inwardly open. Alternatively, the annular filter-side coupling part may be arranged radially outside at least one seal seating groove. The at least one seal seating groove may in this case be radially outwardly open.

The head-side coupling part may advantageously be realized as a hollow cylinder section or on a hollow cylinder section. A perimeter wall of the hollow cylinder section may advantageously be arranged, with respect to the coupling axis, at least partially radially between the at least one seal and at least one filter-side coupling part. A perimeter side of the hollow cylinder section may have at least one head-side coupling element. The other perimeter side may have at least one head-side sealing surface for at least one seal, in particular an outer seal.

In a further advantageous embodiment, it is possible to arrange at least one force-transmission element, in particular a force-transmission ring, in an axial-force-transmitting manner between at least one cover part and/or at least one filter-side coupling part on one side and the shaped flange on the other side with respect to the coupling axis.

An additional contour may be realized with the at least one force-transmission element. With the at least one force-transmission element, axial forces can be absorbed by the filter element and transmitted to the shaped flange and thereby be kept away from the shaped sheet-metal part, in particular at least one seal seating groove. A requirement for the mechanical stability of the shaped sheet-metal part can thereby be reduced accordingly. In this way, relatively thin sheet metal may also be used for the realization of the shaped sheet-metal part.

Moreover, at least one cover part and/or at least one filter-side coupling part, in particular injection-molded parts, may thus be easily constructed. A stability of the bracing of the at least one cover part and/or the at least one filter-side coupling part against the housing, in particular the housing bowl, may be increased with the at least one force-transmission element.

Advantageously, at least one force-transmission element may be made out of sheet metal. Advantageously, a wall thickness of the sheet metal of the at least one force-transmission element may be greater than the wall thickness of the shaped sheet-metal part.

Advantageously, at least one force-transmission element may be equipped with bracing and/or stabilizing structures. The mechanical stability, in particular with respect to the coupling axis in the axial direction, may be improved in this way. To achieve the same mechanical stability, in particular with respect to axial force-transmission, thinner walls may also be employed. Material can be conserved in this way. This may have a positive effect with respect to both the weight and the space requirements. Advantageously, at least one force-transmission element may have embossed textures. The embossed structures can extend at least axially.

Advantageously, at least one force-transmission element may be realized in one piece or in multiple pieces with at least one cover part, in particular a housing cover, and/or at least one filter-side coupling part. In this way, any manufacturing effort and/or installation effort and/or component expense may be reduced. Advantageously, at least one force-transmission element may be realized as an extension of at least one cover part and/or of a filter-side coupling part.

Alternatively or additionally, at least one force-transmission element may be realized separately from at least one cover part and/or at least one filter-side coupling part. In this way, the corresponding components may be realized independently from each other, also in different materials.

Advantageously, at least one force-transmission element may be realized as a force-transmission ring. In particular, axial forces can be transmitted evenly around the perimeter with respect to the coupling axis via the force-transmission ring.

In a further advantageous embodiment, a seating for at least one force-transmission element may be realized, with respect to the coupling axis, radially between the shaped sheet-metal part and a peripheral wall of the housing bowl. The at least one force-transmission element can thus be arranged in the seating in a space-saving manner. The at least one force-transmission element may run roughly parallel to at least one section of the shaped sheet-metal part with respect to an axial force transmission.

In a further advantageous embodiment, the shaped sheet-metal part may have at least one locking element, in particular at least one locking tab, of an anti-rotation lock that works together with at least one counter-locking element, in particular at least one locking seat, of the anti-rotation lock on the side of at least one filter-side coupling part, in particular a cover part, in order to limit, in particular to prevent, a relative rotation between the shaped sheet-metal part and the at least one filter-side coupling part, in particular the cover part.

Advantageously, at least one locking element may be realized as a projecting element on the shaped sheet-metal part, in particular as a tab, foot or pin. At least one locking element may be realized as an axial extension of the shaped sheet-metal part.

At least one counter-locking element on the side of at least one filter-side coupling part, in particular a cover part, may be realized as a recess or seat, in particular hole or openings, into which at least one projecting locking element can engage.

Alternatively or additionally, at least one counter-locking element on the side of at least one filter-side coupling part, in particular a cover part, may be realized as a projecting element, and at least one corresponding locking element on the side of the shaped sheet-metal part may be realized as a recess or seat.

Advantageously, the anti-rotation lock may have a plurality of locking elements and counter-locking elements that work together in pairs. This makes it possible to achieve an even distribution of force. The locking elements/counter-locking elements may advantageously be arranged around the perimeter with respect to the coupling axis, in particular with even distribution.

The anti-rotation lock makes it possible to transmit a torque from the housing bowl via the shaped flange and the shaped sheet-metal part to the at least one filter-side coupling part, in particular the cover part. Thus, the at least one filter-side coupling part may be joined to or separated from the filter head by turning the housing bowl relative thereto.

The locking elements/counter-locking elements can advantageously work together while maintaining a certain amount of play. This makes it possible to compensate for a position tolerance between the shaped sheet-metal part and the at least one filter-side coupling part, in particular the cover part. Alternatively or additionally, locking elements/counter-locking elements may also work together in a manner free of play.

Furthermore, the object of the invention is achieved via the filter device by the replaceable filter having:
- a housing bowl in which at least one filter element is arranged,
- at least one filter-side coupling part of a coupling device arranged on the end face of the housing bowl for detachable connection of the replaceable filter to a filter head of the filter device via a pushing and/or turning movement with respect to a coupling axis of the replaceable filter,
- at least one opening arranged on the end face of the housing bowl, in particular a central opening in the middle and/or at least one fluid opening that is radially outwardly offset with respect to the central opening and/or with respect to the coupling axis.
- a shaped sheet metal part connected to the end face rim of the housing bowl via a shaped flange, in particular a sheet-metal ring that is in particular integrally manufactured as one piece, having at least one molded seal seating groove that is open in the radial direction and peripheral with respect to the coupling axis, in particular coaxial, for the seating of at least one seal, in particular an outer seal, wherein at least one seal seating groove runs radially around the outside of at least one opening, as appropriate the central opening and/or the at least one fluid opening, with respect to the coupling axis, and wherein at least one seal is be arranged in at least one seal seating groove and has at least one sealing surface oriented radially and/or axially with respect to the coupling axis for contacting at least one filter-head side sealing surface that is oriented radially and/or axially with respect to the coupling axis in order to seal at least one fluid compartment formed between the replaceable filter and the filter head from the surrounding environment when the replaceable filter is installed on the filter head.

The advantages and features pointed out above in connection with the replaceable filter according to the invention and its advantageous embodiments apply accordingly for the filter device according to the invention and its advantageous embodiments and vice-versa.

BRIEF DESCRIPTION OF THE DRAWINGS

Other advantages, features, and details of the invention shall be made more apparent by the following description, which addresses an embodiment of the invention in greater detail, with reference to the accompanying drawings. One skilled in the art will also expediently consider the features disclosed in combination in the drawings, the description, and the claims on an individual basis and combine them into other appropriate combinations. In the schematic drawings:

Identical components are provided with the same reference numbers in the figures.

DETAILED DESCRIPTION

Figure 1:
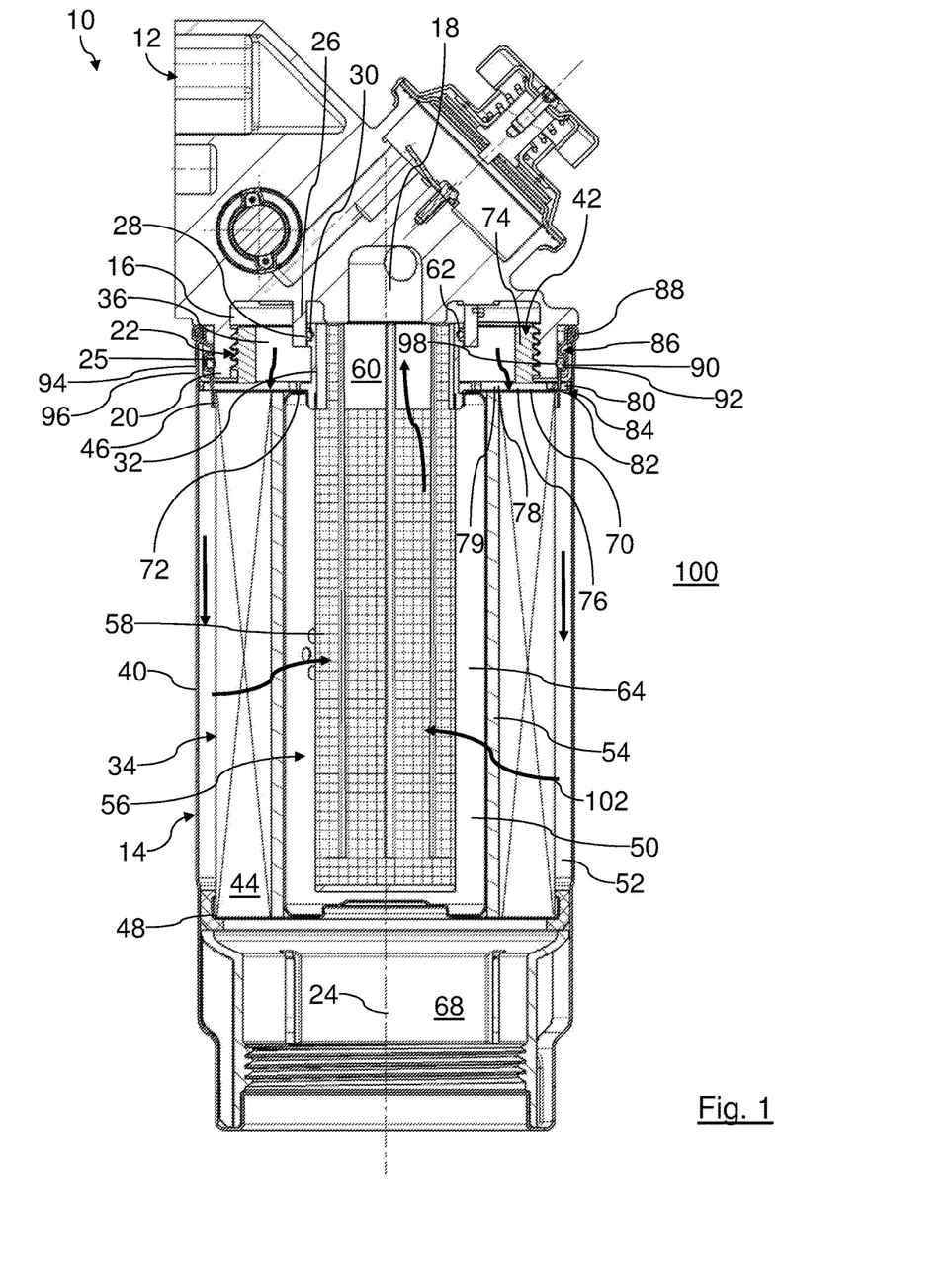
FIG. 1 is a longitudinal section of a filter system for engine oil of an internal combustion engine having a filter head on which a replaceable filter is attached via a detachable coupling device.
Figure 4:
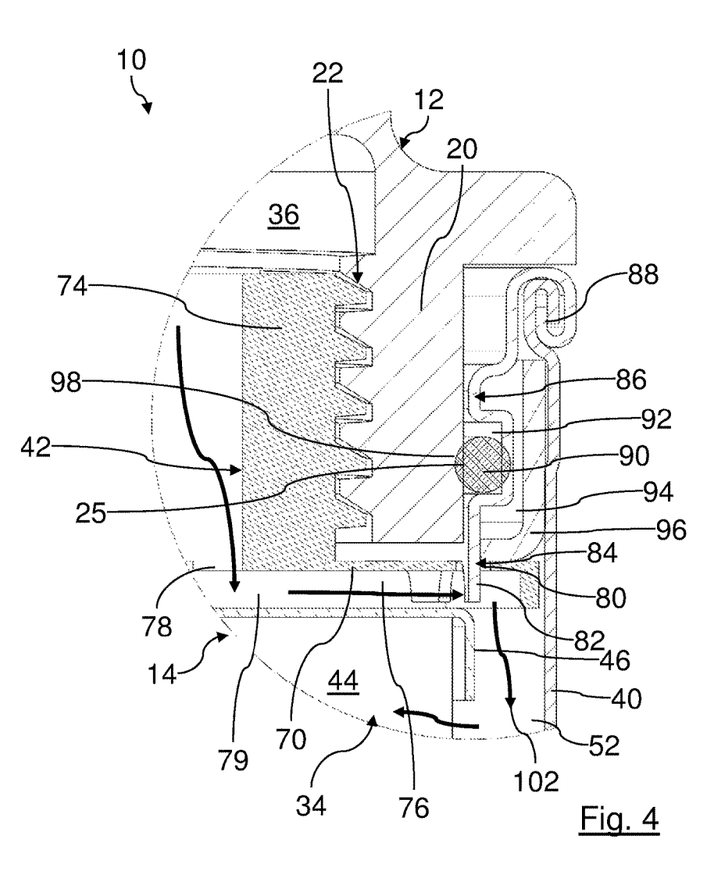
FIG. 4 is a detail view of the longitudinal section of the filter system from FIG. 1 in the region of an outer seal between the replaceable filter and the filter head.

In FIG. 1, a filter system 10, for example for engine oil of an internal combustion engine of a motor vehicle, is shown in longitudinal section. FIG. 4 shows a detail view of filter system 10. Filter system 10 may alternatively also be used for another operating fluid, such as fuel, of an internal combustion engine.

Filter device 10 comprises a filter head 12, to which a replaceable filter 14 is releasably attached. Filter head 12 is made of metal. The filter head 12 is fixedly connected to the internal combustion engine and serves as a connector part for the replaceable filter 14. Filter head 12 comprises an inlet 16 and an outlet 18 for the engine oil. Inlet 16 and outlet 18 are connected to corresponding oil lines of the internal combustion engine in a manner that is not of further interest here.

Furthermore, filter head 12 has a head-side coupling part 20 of a detachable coupling device, which is designated overall as 22, for coupling replaceable filter 14 to filter head 12. Head-side coupling part 20 is made of metal.

Head-side coupling part 20 is in the form of a hollow cylindrical section that is integrally joined as one piece with the main part of the filter head 12. Head-side coupling part 20 is coaxial with respect to a filter axis 24. On its radially inward perimeter side, head-side coupling part 20 has interior threads as a coupling element. The radially outer perimeter side of head-side coupling part 20 forms an outer sealing surface 25.

Any subsequent reference to "axial", "radial", "coaxial", "peripheral", or the like is made with respect to coupling axis 24, unless otherwise indicated.

Filter head 12 further comprises a coaxial cylindrical connecting piece 26, which is located radially inside head-side coupling part 20. An interior space of connecting piece 26 is connected to outlet 18 of filter head 12.

At its end axially toward replaceable filter 14, connecting piece 26 has a sealing surface 28 for an inner seal 30 on its radially inner perimeter side. Inner seal 30 is located radially to the outside at the end of a connection cylinder 32 of a filter element 34 of replaceable filter 14. Connecting piece 26 slips onto connection cylinder 32.

Connecting piece 26 and connection cylinder 32 are radially surrounded by an annular inlet space 36. Annular inlet space 36 is formed between filter head 12 and replaceable filter 14.

Figure 2:
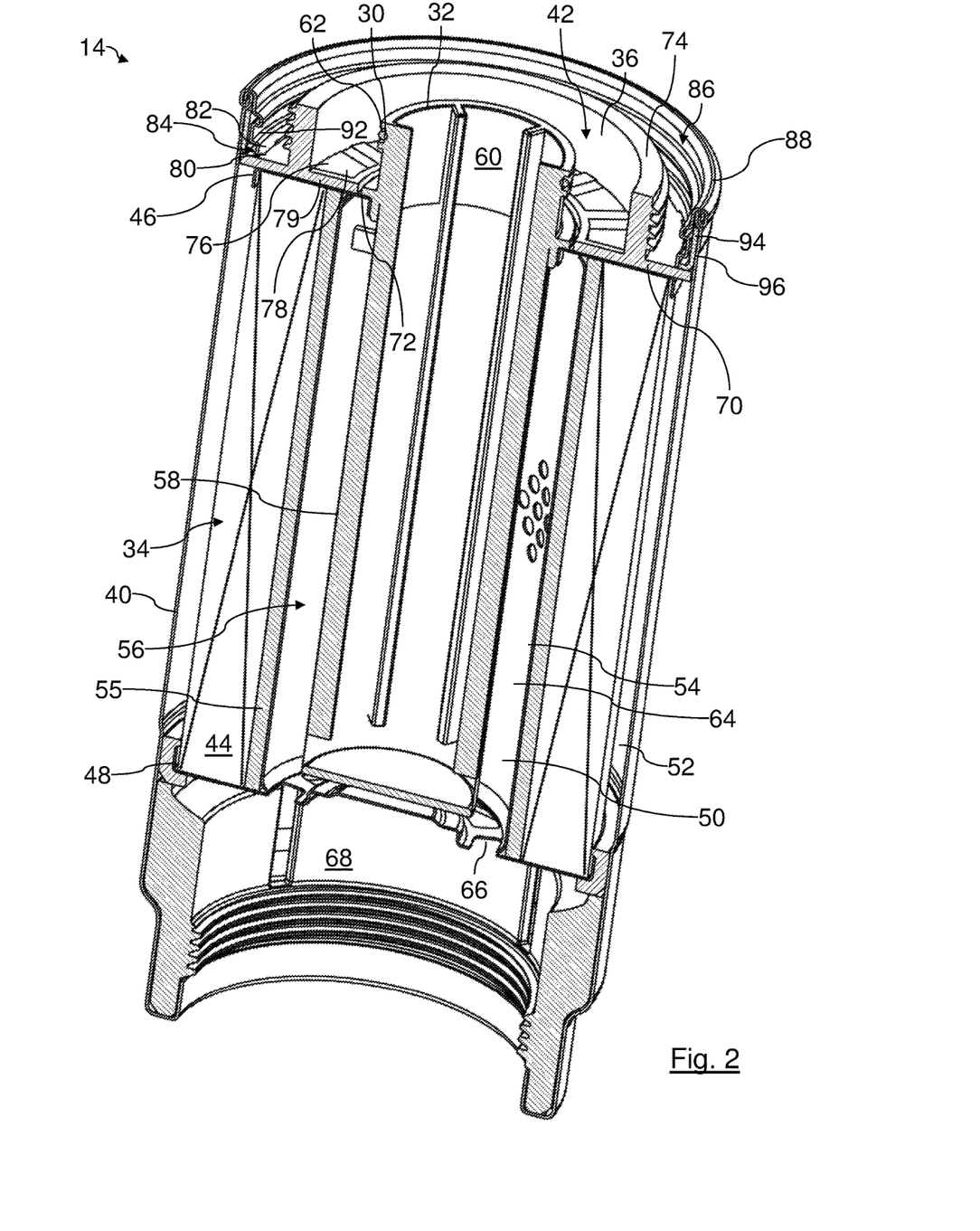
FIG. 2 is a longitudinal section of the replaceable filter from FIG. 1.
Figure 3:
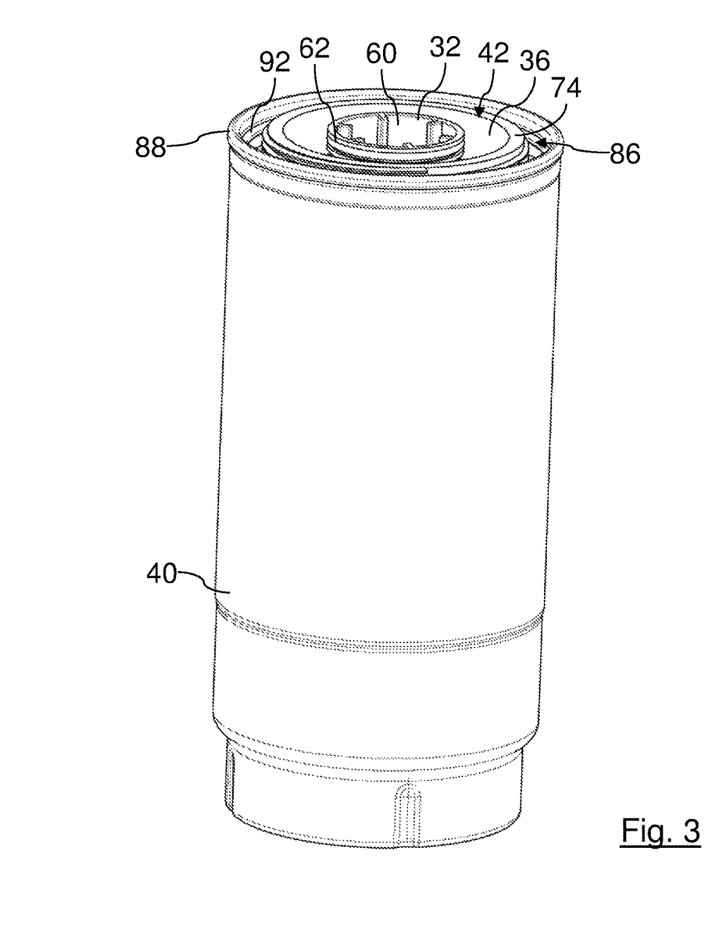
FIG. 3 is an isometric representation of the replaceable filter from FIGS. 1 and 2.

Replaceable filter 14, which is shown in detail in FIG. 2 and in longitudinal section in FIG. 3, is designed as a spin-on filter having a round cross-section. It is essentially coaxial to the filter axis 24. Replaceable filter 14 has a housing bowl 40 in the open side of which a housing cover 42 is attached.

Filter element 34, which is designed as a round filter element, is coaxially arranged within housing bowl 40. Filter element 34 has a filter medium 44 that is folded in a zig-zag shape and is circumferentially closed. At end faces thereof, filter medium 44 is respectively connected in a sealed manner to a connecting end plate 46 (above in FIGS. 1 and 2) and a counter end plate 48 (below in FIGS. 1 and 2).

Connecting end plate 46 is located on the side of filter element 34 that faces housing cover 42. Filter medium 44 surrounds an element interior space 50 of filter element 34. Element interior space 50 is located on a downstream, post-filtration side of filter element 44.

Counter end plate 48 closes element interior space 50 on the end face of filter element 34 that faces a bowl bottom of housing bowl 40. In the present exemplary embodiment, the bowl bottom can be screwed into a corresponding interior threading at a radially inner peripheral side of housing bowl 40 (below in FIGS. 1 and 2). The bowl bottom is not shown in FIGS. 1 and 2. On the side facing the bowl bottom, filter element 34 axially braces—with a ring seal being interposed—against a corresponding step of housing bowl 40 in a manner that is not of further interest here.

Filter element 34 is surrounded radially on the outside by a pre-filtration-side annular space 52 that is delimited by the radially inner peripheral side of housing bowl 40.

A coaxial center tube 54 extends in element interior space 50 between counter end plate 48 and connecting end plate 46. A perimeter wall of center tube 54 has a plurality of through-holes for engine oil.

Furthermore, a coalescence medium 55 of a water separating device 56 is arranged between the radially inner peripheral side of filter medium 44 and the radially outer peripheral side of center tube 54. With coalescence medium 55, very small water drops can be combined to form larger water drops.

Connecting end plate 46 has a coaxial central opening through which a coaxial separating tube 58 of water separating device 56 is guided. Separating tube 58 forms connection cylinder 32 on the outer side of filter element 34 outside of element interior space 50. At its end with connection cylinder 32, separating tube 58 is open. At its axially opposite end, which is toward counter end plate 48, separating tube 58 is closed. Inside element interior space 50, separating tube 58 is configured as a strainer basket. A peripheral wall of separating tube 58 has a hydrophobic sieve material there that is permeable for engine oil.

Connection cylinder 32 defines a coaxial outlet opening 60 of replaceable filter 14 for the filtered engine oil. Outlet opening 60 forms a central oil discharge channel.

In the region of its end faces that faces away from element interior space 50, connection cylinder 32 has a coaxial seal groove 62 for inner seal 30. Inner seal 30 is configured as an O-ring seal. When replaceable filter 14 is installed, the radially outer side of inner seal 30 lies tightly against sealing surface 28 of connecting piece 26 of head-side coupling part 20. Inner seal 30 acts to seal in the radial direction. Inner seal 30 separates in a sealing manner an inflow pre-filtration side of filter element 34 radially outside of connection cylinder 32, respectively annular inlet space 36, from the post-filtration side.

An annular space between the radially outer side of separating tube 58 and the radially inner side of center tube 54 forms a precipitation slot 64 for water, which is separated out from the engine oil via water separation device 56. On its side facing connecting end plate 46, precipitation slot 64 is sealed with said plate and a radially outwardly protruding collar of separating tube 58.

Counter end plate 48 has water outlet openings 66, which are shown in FIG. 2 and which connect precipitation slot 64 with a water collection chamber 68. Water collection chamber 68 is located between the bowl bottom (not shown in the figures) of housing bowl 40 and counter end plate 48. The bowl bottom can be unscrewed to drain water that has collected in water collection chamber 68.

Figure 5:
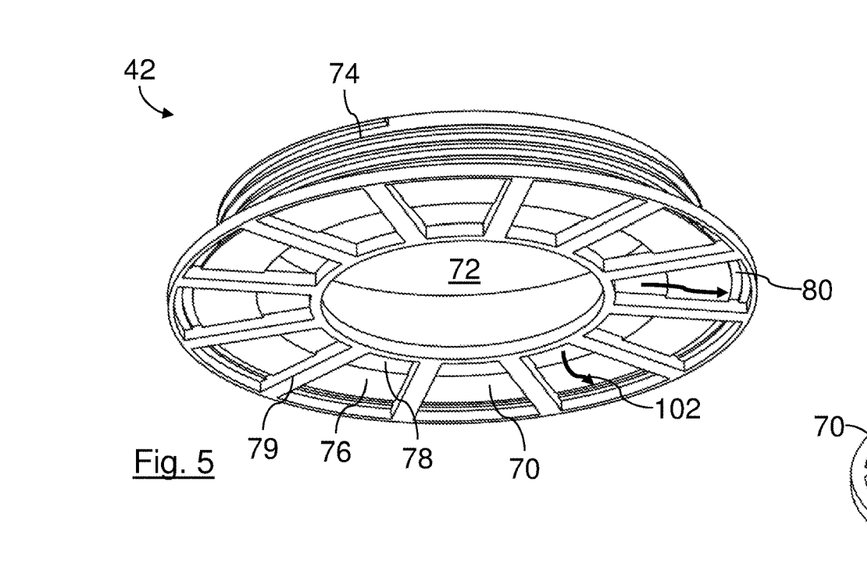
FIG. 5 is an isometric representation of a housing cover of the replaceable filter from FIGS. 1 to 4 with a view of an interior side facing the interior space of the replaceable filter.
Figure 6:
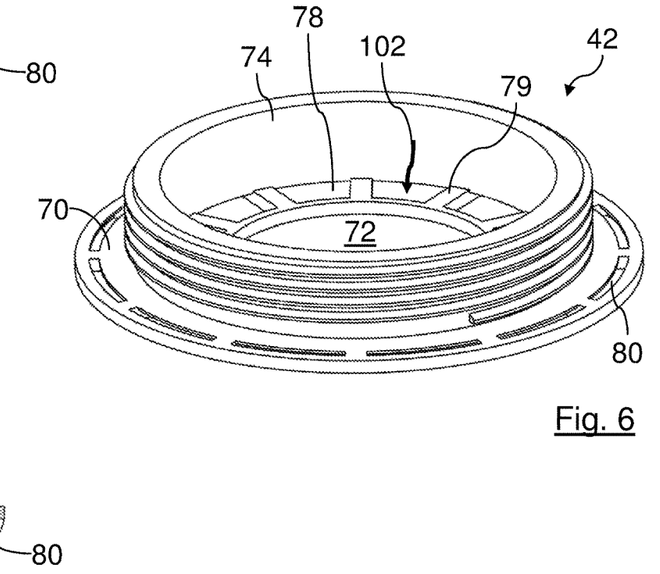
FIG. 6 is an isometric representation of the housing cover from FIG. 5 with a view of its outer side.
Figure 7:
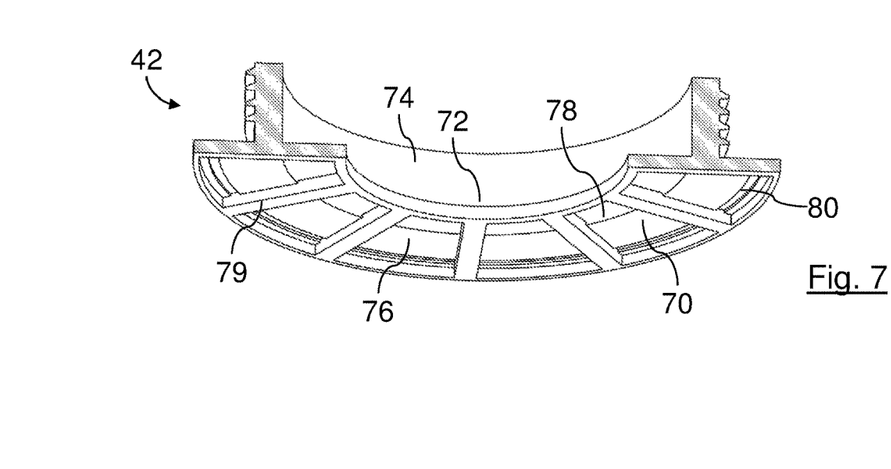
FIG. 7 is a longitudinal section of the housing cover from FIGS. 5 and 6.

Housing cover 42 is shown in detail in FIGS. 5 to 7. Housing cover 42 is injection-molded plastic in one piece. It has a coaxial annular disk section 70. Annular disk section 70 has a coaxial through-hole 72 for connection cylinder 32 of filter element 34.

Viewed in the radial direction, roughly in the center between the radially inner rim and the radially outer rim of annular disk section 70, a filter-side coupling part 74 of coupling device 22 is joined as one piece with annular disk section 70. Filter-side coupling part 74 has the shape of a round coaxial hollow cylinder. Filter-side coupling part 74 extends along the outer side of housing cover 42 that faces axially away from filter element 34. On its radially outer peripheral side, filter-side coupling part 74 has outer threads as a coupling element that fit the inner threads of head-side coupling part 20.

Annular disk section 70 has on its inner side that faces axially away from filter-side coupling part 74 a plurality of circular-sector-type cutouts. The cutouts are arranged distributed around the perimeter and each extend in the radial direction. The cutouts form inlet channels 76 for the engine oil to be filtered. In the area of annular disk section 70 radially between the radially inner peripheral side of filter-side coupling part 74 and radially inner peripheral side of annular disk section 70, the cutouts are axially completely open and there form inlet openings 78 of inlet channels 76. Inlet channels 76 connect annular inlet space 36 of filter head 12 to with annular space 52 of housing bowl 40. Radially extending ribs 79 between adjacent inlet channels 76 serve as spacers and axially brace against the outer side of connecting end plate 46. A coaxial ring section defines through-hole 72 and connects the radially inner ends of ribs 79.

In the region of the radially outer rim of annular disk section 70, the cutouts radially outside filter-side coupling part 74 are also axially completely open and there form peripherally extending slot-type locking seats 80 for locking tabs 82 of an anti-rotation lock 84 of a cover sheet-metal ring 86. Radially between locking seats 80 and inlet openings 78, the rear walls of inlet channels 76 that face the outer side of housing cover 42 are closed.

Figure 8:
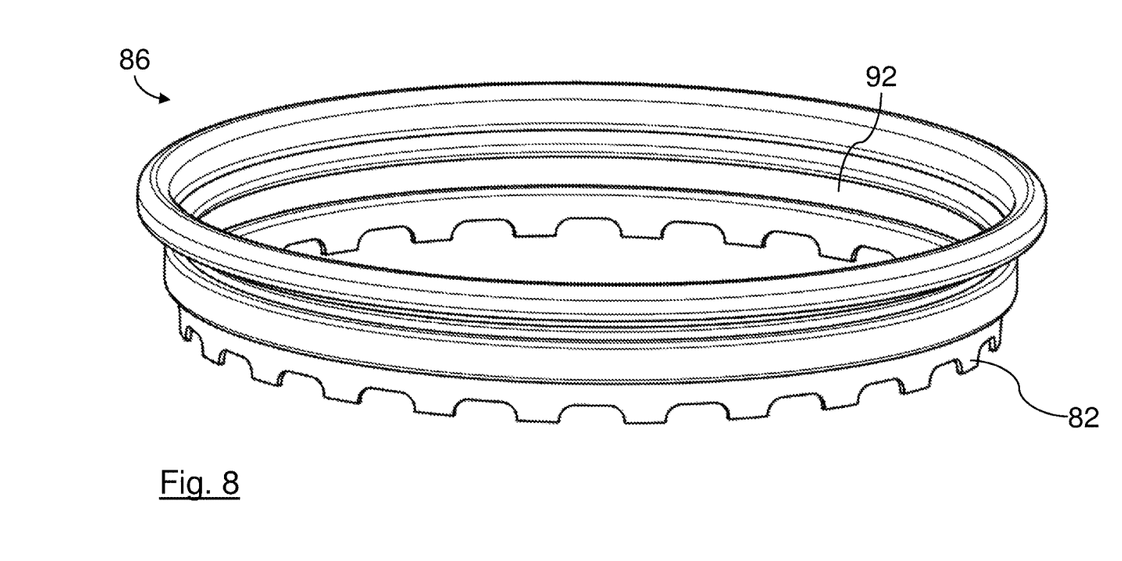
FIG. 8 is an isometric representation of a cover sheet-metal ring of the replaceable filter from FIGS. 1 to 4.
Figure 9:
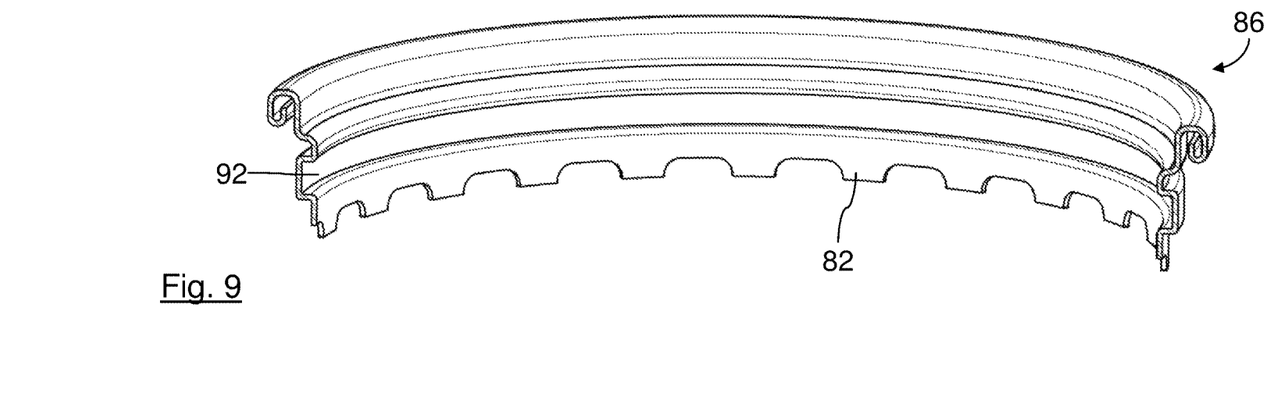
FIG. 9 is a longitudinal section of the cover sheet-metal ring from FIG. 8.

Cover sheet-metal ring 86 is shown in detail in FIGS. 8 and 9. Cover sheet-metal ring 86 is formed out of sheet metal. It has a profile bent multiple times. Its radially outer peripheral side, it is fixedly connected to an open rim of housing bowl 40 via a crimped joint 88. Crimped joint 88 is a shaped flange.

Cover sheet-metal ring 86 serves as a retainer for an outer seal 90 and housing cover 42 on housing bowl 40. Radially inside crimped joint 88, cover sheet-metal ring 86 is approximately coaxially cylindrical. In the axial direction when viewed from crimped joint 88 toward the bowl bottom of housing bowl 40 behind crimped joint 88, cover sheet-metal ring 86 has an annular collar extending radially inward. The annular collar delimits a seal seating groove 92 on the axial side facing crimped joint 88.

Seal seating groove 92 has a U-shaped profile and is radially inwardly open. A locking region connects to seal seating 92 via locking tabs 82 of anti-rotation lock 84.

Locking tabs 82 are arranged distributed around the perimeter. They each extend in the axial direction away from seal seating groove 92.

Outer seal 90 is arranged within seal seating groove 92. Outer seal 90 is underneath the side of crimped joint 88 that faces toward filter head 12, that is, inside housing bowl 40. Outer seal 90 is an O-ring seal. Outer seal 90 is radially inwardly oriented with respect to filter axis 24. Outer seal 90 acts in the radial direction.

An annular seat 94 for a force-transmission ring 96 is realized radially between cover sheet-metal ring 86 and the radially inner peripheral side of housing bowl 40, as is shown in FIGS. 1, 2 and 4. The annular seat 94 is open on its side facing away from crimped joint 88.

Force-transmission ring 96 is made of metal, for example, bent sheet metal. It has a round hollow cylindrical section that is radially inwardly bent approximately 90° on the side facing axially away from crimped joint 88. Overall, force-transmission ring 96 has a roughly J-shaped profile, the lower portion of the "J" being radially inwardly oriented.

One rim of force-transmission ring 96 braces against a radially inwardly bent shoulder of the peripheral wall of housing bowl 40 in the area of crimped joint 88. The radially inwardly bent section of force-transmission ring 96 axially braces against the outer side of annular disk section 70 of housing cover 42. In this way, an axial force may be directly transmitted between housing cover 42 to crimped joint 88 and, thus, to housing bowl 40 via force-transmission ring 96 without cover sheet-metal ring 86 being mechanically stressed. In so doing, the radially inner rim of the radially inwardly bent section of force-transmission ring 96 on the side facing toward annular disk section 70 maintains a radial play in relation to cover sheet-metal ring 86. Seal seating groove 92 together with outer seal 90 is located axially between the aforementioned two axial bracing points of force-transmission ring 96.

For the manufacture of replaceable filter 14, housing bowl 40 is formed out of sheet metal. Cover sheet-metal ring 86 is formed from a sheet metal blank via a deep-drawing process in combination with a hydroforming process, so that the corresponding contour is produced with seal seating groove 92. Force transmission ring 96 is made of metal by, for example, shaping and/or casting.

Housing cover 42 is made as one piece along with filter-side coupling part 74, the outer threads, inlet channels 76 and locking seats 80 as a plastic injection-molded part or is manufactured as a shaped sheet-metal part.

Filter element 34 is pre-assembled out of folded filter medium 44, coalescence medium 55, end plates 74 and 76, center tube 54 and separating tube 58.

Filter element 34 is inserted—counter end plate 48 first and the ring seal being interposed—axially with respect to filter axis 24 into housing bowl 40.

Housing cover 42 is inserted—with its inner side that axially faces away from filter-side coupling part 74 first—axially with respect to filter axis 24 into the open side of housing bowl 40, so that connection cylinder 32 of separating tube 58 of filter element 34 protrudes through through-hole 72 of annular disk section 70.

Then, force-transmission ring 96 is inserted—with its radially inwardly bent section first—axially with respect to filter axis 24 through the opening of housing bowl 40 and placed on the outer side of housing cover 42 that faces away from element interior space 50.

Cover sheet-metal ring 86 is inserted—locking tabs 82 first—axially through the opening of housing bowl 40 and placed on the outer side of housing cover 42, so that locking tabs 82 each project through a locking seat 80 of housing cover 42.

Then the open rim of housing bowl 40 is crimped radially outwardly together with the corresponding rim of cover sheet-metal ring 86, sealing material being interposed, thereby realizing crimped joint 102.

Finally, outer seal 90 is inserted into seal seating groove 92. This may also be done even at an earlier point in time.

For the connection with filter head 12, replaceable filter 14 is first moved—housing cover 42 first—with an insertion movement that is axial with respect to a coupling axis—which in the exemplary embodiment coincides with filter axis 24—toward head-side coupling part 20 of filter head 12. The head-side coupling part 20 is thus inserted in the open area between filter-side coupling part 74 and cover sheet-metal ring 86 in such a way that the inner threads of head-side coupling part 20 meet the outer threads of filter-side coupling part 74.

With a turning movement of replaceable filter 14 in the closing direction, filter-side coupling part 74 is screwed into head-side coupling part 20. As this happens, outer sealing surface 25 of head-side coupling part 20 slides along a radially inner sealing surface 98 of outer seal 90.

In the closed state of coupling device 22, radially inner sealing surface 98 of outer seal 90—with an radially inwardly sealing effect—comes against outer sealing surface 25 of head side coupling part 20. Outer seal 90 seals off the unfiltered oil area—in particular annular inlet space 36 and inlet channels 76—from surrounding environment 100. Furthermore, inner seal 30—with a radially outwardly sealing effect—comes against sealing surface 28 of connecting piece 26 of filter head 12. The rim of head-side coupling part 20 that faces replaceable filter 14 maintains an axial play with respect to the outer side of annular disk section 70 of housing cover 42 that faces said rim.

When filter system 10 is in operation, engine oil to be filtered is fed through inlet 16 of filter head 12 to annular inlet space 36. The flow of the engine oil within filter system 10 is indicated in particular in FIGS. 1, 4, 5 and 6 by curved arrows 102. From annular inlet space 36, the engine oil goes through inlet channels 76 into annular space 52 of replaceable filter 14. The engine oil to be filtered flows through filter medium 44 from radially outside to radially inside and is relieved of particles. In coalescence medium 55, any very small water drops that may be in the engine oil are combined into large water drops. The engine oil with the water drops flows through the through-holes in the perimeter wall of center tube 54 into precipitation slot 64.

The engine oil flows through the sieve-like hydrophobic perimeter wall of separating tube 58 and arrives in its interior space. The filtered engine oil exits the interior space of separating tube 58—thus, also exiting element interior space 50—through outlet opening 60 and arrives in the interior space of connecting piece 26. From there out, the engine oil, which has been filtered and relieved of water, flows into outlet 18 of filter head 12 and exits filter system 10.

The water drops, on the other hand, are held back against the radially outer perimeter side of separating tube 58, drop down by gravitational force into precipitation slot 64 and go through water outlet openings 66 in counter end plate 48 into water collection chamber 68 of replaceable filter 14. From there, the separated out water may be removed from replaceable filter 14.

What is claimed is:

1. A replaceable spin-on filter, of a filter device (10) for filtering a fluid, comprising:
    a housing bowl (40) circumferentially enclosing an open space within the housing bowl (40);
    a round hollow filter element (34) of a filter medium (44), arranged in the open space within the housing bowl (40), the round hollow filter element concentric with a coupling axis (24) extending coaxially though a hollow center of the round hollow filter element (34), wherein axial is defined as a direction parallel to the coupling axis (24) and radial is defined as a direction traverse to the coupling axis (24);
    a housing cover part (42) arranged on an end face of the housing bowl (40) and in a radial interior of the housing bowl (40), the housing cover part (42) including:
        a filter side coupling part (74) formed as a round, hollow cylinder, elongated in an axial direction;
        an annular disk (70) formed on an axial inner end of the filter side coupling part (74) facing the round hollow filter element (34), the annular disk (70) having a coaxial through hole (72) extending through the annular disk (70), the annular disk including:
            a radial inner ring arranged at an outer circumference of the coaxial through hole (72);
            a plurality of slotted locking seats (80) spaced apart circumferentially on and extending axially through the annular disk (70), the plurality of slotted locking seats arranged radially between the housing bowl (40) and the filter side coupling part (74);
            at least one fluid opening (78) extending axially through the annular disk (70), the at least one fluid opening (78) arranged radially between the filter side coupling part (74) and the coaxial through hole (72) of the annular disk (70);
        wherein the filter-side coupling part (74) is configured and adapted to detachably connect the replaceable spin-on filter (14) onto a filter head (12) of the filter device (10) via a rotational movement with respect to the coupling axis (24);
    a shaped sheet metal part (86) formed as a ring and connected to an end face rim of the housing bowl (40) via a shaped flange (88);
    wherein the shaped sheet metal part (86) is a sheet-metal ring that is integrally manufactured as one piece and has at least one molded seal seating groove (92) that is open in the radial direction and peripheral or coaxial with respect to the coupling axis (24);
    wherein the shaped sheet-metal part (86) has at least one locking element configured as at least one locking tab (82) of an anti-rotation lock (84);
    wherein the anti-rotation lock (84) comprises:
        the at least one locking tab projecting axially away from the shaped sheet-metal part (86) and towards the plurality of slotted locking seats (80), the at least one locking tab engaging into a respective one of at least one slotted locking seat (80) of the housing cover part (42);
        wherein the anti-rotation lock (84) prevents a relative rotation between the shaped sheet-metal part (86) and the housing cover part (42);
    wherein the at least one molded seal seating groove (92) receives and seats at least one seal (90);
    wherein at least one seal seating groove (92) runs radially around the outside the at least one fluid opening (78), with respect to the coupling axis (24); and wherein the at least one seal (90) is arranged in the at least one seal seating groove (92) has at least one sealing surface (98) oriented radially and/or axially with respect to the coupling axis (24) configured and adapted for contact against at least one sealing surface (25) on a filter head side that is oriented radially and/or axially with respect to the coupling axis (24) in order to seal at least one fluid compartment (36) formed between the replaceable spin-on filter (14) and the filter head (12) from a surrounding environment (100) when the replaceable spin-on filter (14) is installed on the filter head (12).

2. The replaceable spin-on filter according to claim 1, wherein
the at least one seal seating groove (92) is radially inwardly open with respect to the coupling axis (24).

3. The replaceable spin-on filter according to claim 1, wherein
the housing bowl (40) is made of sheet metal at least in a region of the end face rim of the housing bowl.

4. The replaceable spin-on filter according to claim 1, wherein
a side of at least one seal seating groove (92) that is radially open with respect to the coupling axis (24) is arranged with respect to the coupling axis (24), when viewed from a radial perspective, opposite a coupling side of at least one filter-side coupling part (74) configured as a threading connection, which is located on the same side with respect to the coupling axis (24).

5. The replaceable spin-on filter according to claim 1, wherein
a force-transmission ring is arranged with respect to the coupling axis (24) in a force-transmitting manner, between the housing cover part (42) and/or the filter-side coupling part (74) on one side and the shaped flange (88) on the other side.

6. The replaceable spin-on filter according to claim 1, wherein
a seating for at least one force-transmission element (94) is arranged radially between the shaped sheet-metal part (86) and a peripheral wall of the housing bowl (40) with respect to the coupling axis (24).

7. A filter device (10) for filtering a liquid comprising:
a filter head (12);
a replaceable spin-on filter, including:
a housing bowl (40) circumferentially enclosing an open space within the housing bowl (40);
a round hollow filter element (34) of a filter medium (44), arranged in the open space within the housing bowl (40), the round hollow filter element concentric with a coupling axis (24) extending coaxially though a hollow center of the round hollow filter element (34), wherein axial is defined as a direction parallel to the coupling axis (24) and radial is defined as a direction traverse to the coupling axis (24);
a housing cover part (42) arranged on an end face of the housing bowl (40) and in a radial interior of the housing bowl (40), the housing cover part (42) including:
a filter side coupling part (74) formed as a round, hollow cylinder, elongated in an axial direction;
an annular disk (70) formed on an axial inner end of the filter side coupling part (74) facing the round hollow filter element (34), the annular disk (70) having a coaxial through hole (72) extending through the annular disk (70), the annular disk including:
a radial inner ring arranged at an outer circumference of the coaxial through hole (72);
a plurality of slotted locking seats (80) spaced apart circumferentially on and extending axially through the annular disk (70), the plurality of slotted locking seats arranged radially between the housing bowl (40) and the filter side coupling part (74);
at least one fluid opening (78) extending axially through the annular disk (70), the at least one fluid opening (78) arranged radially between the filter side coupling part (74) and the coaxial through hole (72) of the annular disk (70);
wherein the filter-side coupling part (74) is configured and adapted to detachably connect the replaceable spin-on filter (14) onto the filter head (12) of the filter device (10) via a rotational movement with respect to the coupling axis (24);
a shaped sheet metal part (86) formed as a ring and connected to an end face rim of the housing bowl (40) via a shaped flange (88);
wherein the shaped sheet metal part (86) is a sheet-metal ring that is integrally manufactured as one piece and has at least one molded seal seating groove (92) that is open in the radial direction and peripheral or coaxial with respect to the coupling axis (24);
wherein the shaped sheet-metal part (86) has at least one locking element configured as at least one locking tab (82) of an anti-rotation lock (84);
wherein the anti-rotation lock (84) comprises:
the at least one locking tab projecting axially away from the shaped sheet-metal part (86) and towards the plurality of slotted locking seats (80), the at least one locking tab engaging into a respective one of at least one slotted locking seat (80) of the housing cover part (42);
wherein the anti-rotation lock (84) prevents a relative rotation between the shaped sheet-metal part (86) and the housing cover part (42);
wherein the at least one molded seal seating groove (92) receives and seats at least one seal (90);
wherein at least one seal seating groove (92) runs radially around the outside the at least one fluid opening (78), with respect to the coupling axis (24); and
wherein the at least one seal (90) is arranged in the at least one seal seating groove (92) has at least one sealing surface (98) oriented radially and/or axially with respect to the coupling axis (24) configured and adapted for contact against at least one sealing surface (25) on a filter head side that is oriented radially and/or axially with respect to the coupling axis (24) in order to seal at least one fluid compartment (36) formed between the replaceable spin-on filter (14) and the filter head (12) from a surrounding environment (100) when the replaceable spin-on filter (14) is installed on the filter head (12).

* * * * *